US008473783B2

(12) United States Patent
Andrade et al.

(10) Patent No.: US 8,473,783 B2
(45) Date of Patent: Jun. 25, 2013

(54) FAULT TOLERANCE IN DISTRIBUTED SYSTEMS

(75) Inventors: Henrique Andrade, Croton-on-Hudson, NY (US); Kirsten W. Hildrum, Hawthorne, NY (US); Michael J. E. Spicer, Lafayette, CA (US); Chitra Venkatramani, Roslyn Heights, NY (US); Rohit S. Wagle, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 12/942,326

(22) Filed: Nov. 9, 2010

(65) Prior Publication Data

US 2012/0117423 A1 May 10, 2012

(51) Int. Cl.
*G06F 11/00* (2006.01)
(52) U.S. Cl.
USPC .............................. 714/16; 709/223; 709/224
(58) Field of Classification Search
USPC .......................................................... 714/16
See application file for complete search history.

(56) References Cited

U.S. PATENT DOCUMENTS

| 6,854,072 | B1 | 2/2005 | Cagle et al. | |
|---|---|---|---|---|
| 6,928,457 | B2 * | 8/2005 | Jacobs et al. | 1/1 |
| 7,082,553 | B1 | 7/2006 | Wang | |
| 7,308,496 | B2 | 12/2007 | Yeager et al. | |
| 7,430,559 | B2 * | 9/2008 | Lomet | 1/1 |
| 7,814,198 | B2 * | 10/2010 | Christensen et al. | 709/224 |
| 7,926,070 | B2 * | 4/2011 | Sedukhin et al. | 719/321 |
| 7,970,892 | B2 * | 6/2011 | Sedukhin et al. | 709/224 |
| 7,974,939 | B2 * | 7/2011 | Nanjangud Bhaskar et al. | 707/608 |
| 8,024,396 | B2 * | 9/2011 | Sedukhin et al. | 709/201 |
| 8,099,494 | B2 * | 1/2012 | Sedukhin et al. | 709/224 |
| 8,099,720 | B2 * | 1/2012 | Sedukhin et al. | 717/139 |
| 8,181,151 | B2 * | 5/2012 | Sedukhin et al. | 717/104 |
| 8,230,386 | B2 * | 7/2012 | Sedukhin et al. | 717/104 |
| 8,239,505 | B2 * | 8/2012 | Sedukhin et al. | 709/221 |
| 8,275,855 | B2 * | 9/2012 | Kothari et al. | 709/218 |
| 2002/0046230 | A1 * | 4/2002 | Dieterich et al. | 709/107 |
| 2007/0016617 | A1 * | 1/2007 | Lomet | 707/200 |
| 2007/0067266 | A1 * | 3/2007 | Lomet | 707/3 |
| 2012/0072579 | A1 * | 3/2012 | Teather | 709/224 |

OTHER PUBLICATIONS

Aguilera et al., "Sinfonia: A new paradigm for building scalable distributed systems"; ACM Digital Library; vol. 27, Article 5, Issue 3, Nov. 2009.
Cirani, et al., "A Resilient Architecture for DHT-based Distributed Collaborative Environments"; ACM Digital Library; pp. 1-10, Nov. 2008.
Lim, et al., "A study on the design of large-scale mobile recording and tracking systems"; INSPEC/IEEE; vol. 7; pp. 701-710; 1998 (Abstract Only).

* cited by examiner

*Primary Examiner* — Kamini Patel
(74) *Attorney, Agent, or Firm* — William J. Stock, Esq.; Blanche E. Schiller, Esq.; Heslin Rothenberg Farley & Mesiti P.C.

(57) ABSTRACT

Fault tolerance is provided in a distributed system. The complexity of replicas and rollback requests are avoided; instead, a local failure in a component of a distributed system is tolerated. The local failure is tolerated by storing state related to a requested operation on the component, persisting that stored state in a data store, such as a relational database, asynchronously processing the operation request, and if a failure occurs, restarting the component using the stored state from the data store.

20 Claims, 11 Drawing Sheets

514

ASYNCHRONOUS WORK QUEUE

- NON-IDEMPOTENT OPERATION
- NON-IDEMPOTENT OPERATION
- IDEMPOTENT OPERATION
  .
  .
  .

FIG. 6

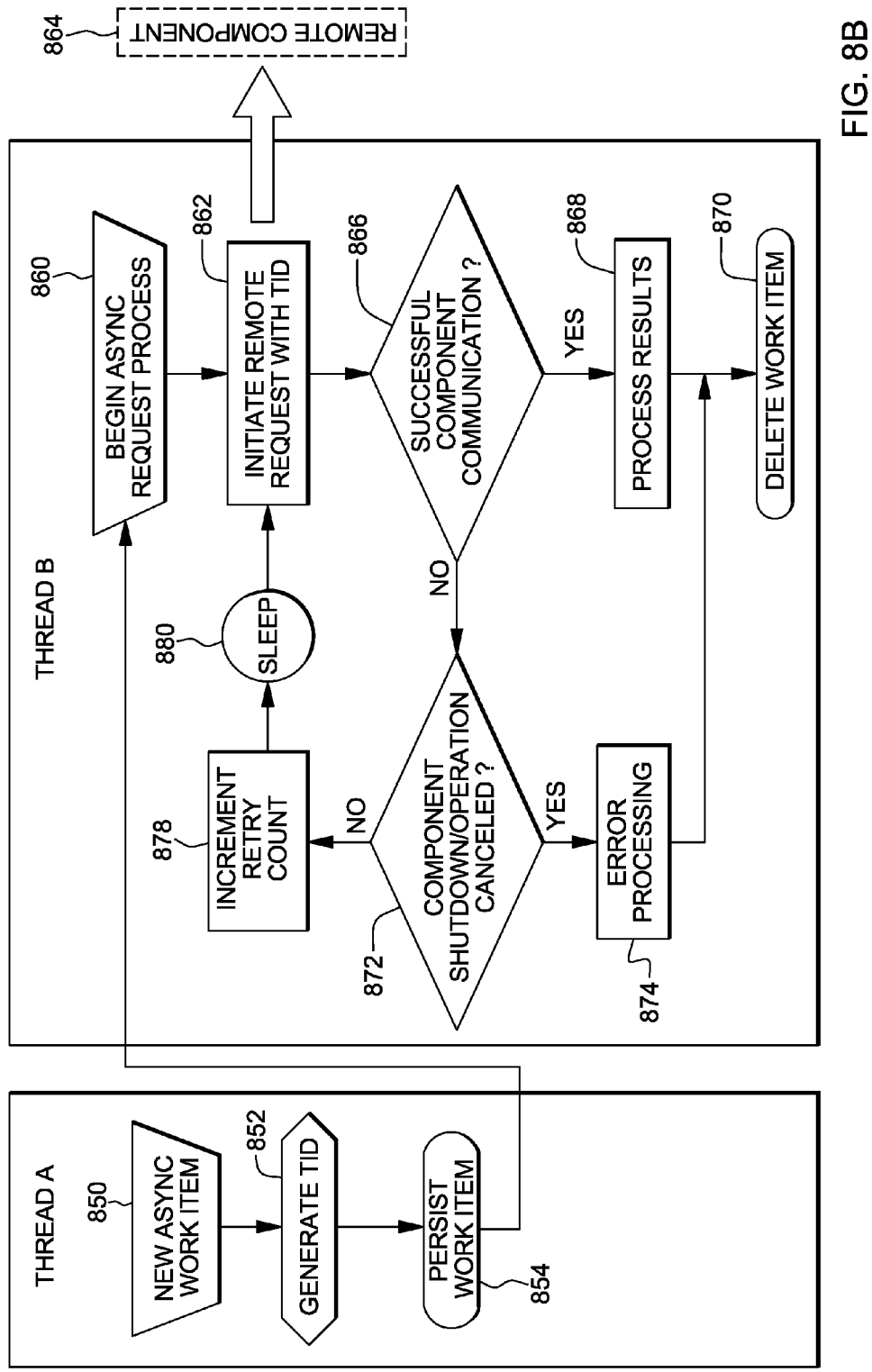

FAULT TOLERANCE IN DISTRIBUTED SYSTEMS

This invention was made with Government support under Contract No. H98230-07-C-0383 awarded by Intelligence Agencys. The Government has certain rights in this invention.

BACKGROUND

This invention relates, in general, to distributed processing, and in particular, to providing fault tolerance in distributed systems.

Fault-tolerant and dependable, large-scale distributed systems are difficult to build because multiple components or network services are employed, and local failures at a particular component of a given service may be very disruptive to the whole system. This is particularly true for middleware that aims to simplify the process of constructing large-scale, distributed applications ranging from low-level infrastructure, such as MPI (Message Passing Interface) and PVM (Parallel Virtual Machine), to Websphere, and web-services based architectures.

To carry out an operation in a large distributed system, typically a chain of activity is triggered across several tiers of distributed components (e.g., from the web front-end to a database system to a credit card clearinghouse component, and so on).

Each component exposes interfaces that other components can invoke remotely. These inter-component operations may be idempotent in that multiple invocations of the same operation does not affect the state of the component, or non-idempotent in that the operation may yield a state change of the component each time it is invoked.

In the current state-of-the-art, one of the techniques for dealing with a failure (i.e., a failure in one component) resulting from a non-idempotent inter-component operation requires rollback operations in one or more components. This technique is cumbersome at best and impossible to use in other cases (e.g., some components may not have the ability to rollback at all). Other approaches rely heavily on the existence of reusable replicas which raise a set of complicated problems in terms of distributed state consistency.

BRIEF SUMMARY

The shortcomings of the prior art are overcome and additional advantages are provided through the provision of a method of managing execution of operation requests to facilitate fault tolerance in a distributed system having a plurality of components. The method includes, for instance, receiving at one component of the distributed system an operation request to be processed, the one component executing on a processor; processing, by the one component, the operation request, the processing including initiating one or more sub-operation requests to be performed by at least one other component of the distributed system; storing at least an indication of the one or more sub-operation requests in an asynchronous work queue to be asynchronously processed by the at least one other component, the asynchronous work queue including one or more sub-operation requests for which processing is incomplete; storing state related to the operation request in a persistent data store, the state including at least an indication of the one or more sub-operation requests on the asynchronous work queue; and responsive to storing the state in the persistent data store and completing the operation request, asynchronously initiating execution of a sub-operation request of the one or more sub-operation requests on the asynchronous work queue.

Systems and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6 depicts one example of the contents of an asynchronous work queue used in accordance with an aspect of the present invention;

FIG. 8B depicts one example of inter-component retry logic used in accordance with an aspect of the present invention.

DETAILED DESCRIPTION

In accordance with an aspect of the present invention, a fault tolerance capability for distributed operations is provided that avoids the complexity of replicas and rollback operation requests. Instead, a local failure of any component among a distributed set of components participating in a distributed operation is tolerated by its peer client components, enabling the distributed operation to complete. The local failure is tolerated by storing state related to a requested operation, asynchronously processing the operation request, and if a failure occurs, restarting the component using the stored state. In accordance with an aspect of the present invention, a fault tolerance policy is implemented across all the system components to ensure that the whole system is resilient to failures and can autonomically recover from failures. This approach is usable in many situations, including those situations in which overall system availability is paramount and downtime has serious performance, safety, or economic implications.

Figure 1A:
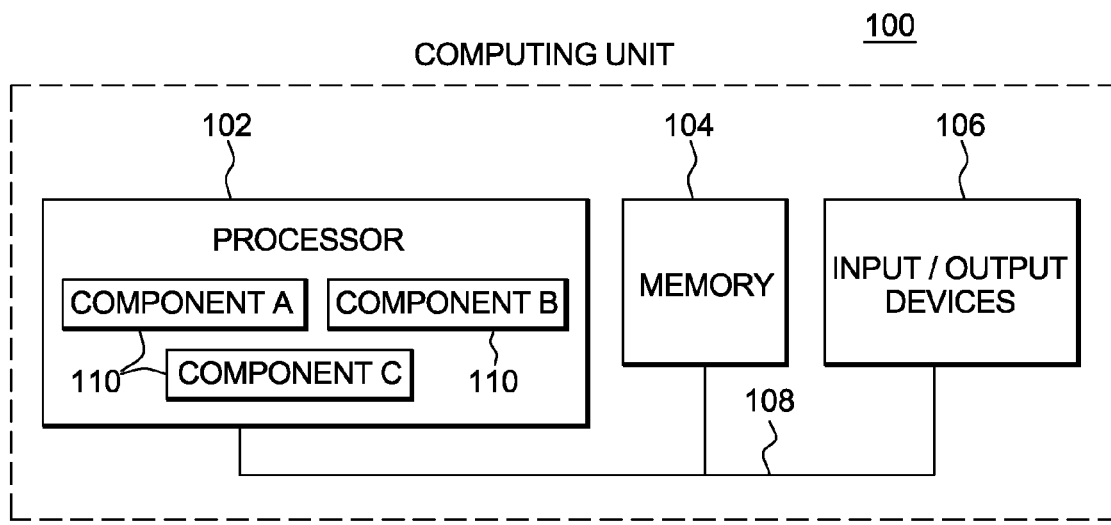
FIG. 1A depicts one embodiment of a single processor computing environment to incorporate and use one or more aspects of the present invention.

One embodiment of a computing environment to incorporate and use one or more aspects of the present invention is described with reference to FIG. 1A. In one example, a computing unit 100 includes, for instance, a processor 102 (e.g., an Intel®, IBM® Blade or any other processor), a memory 104 and one or more I/O devices 106 coupled to one another via one or more system buses 108. Executing within processor 102 are a plurality of components 110 (e.g., servers, computer programs, daemons), each working on a task of a particular operation request (i.e., the main operation request or a sub-operation request, as described below). Thus, the system is distributed in that tasks for one operation request are performed by multiple components. IBM® is a registered trademark of International Business Machines Corporation, Armonk, N.Y. Intel® is a registered trademark of Intel Corporation, Santa Clara, Calif. Other names used herein may be registered trademarks, trademarks or product names of International Business Machines Corporation or other companies.

Figure 1B:
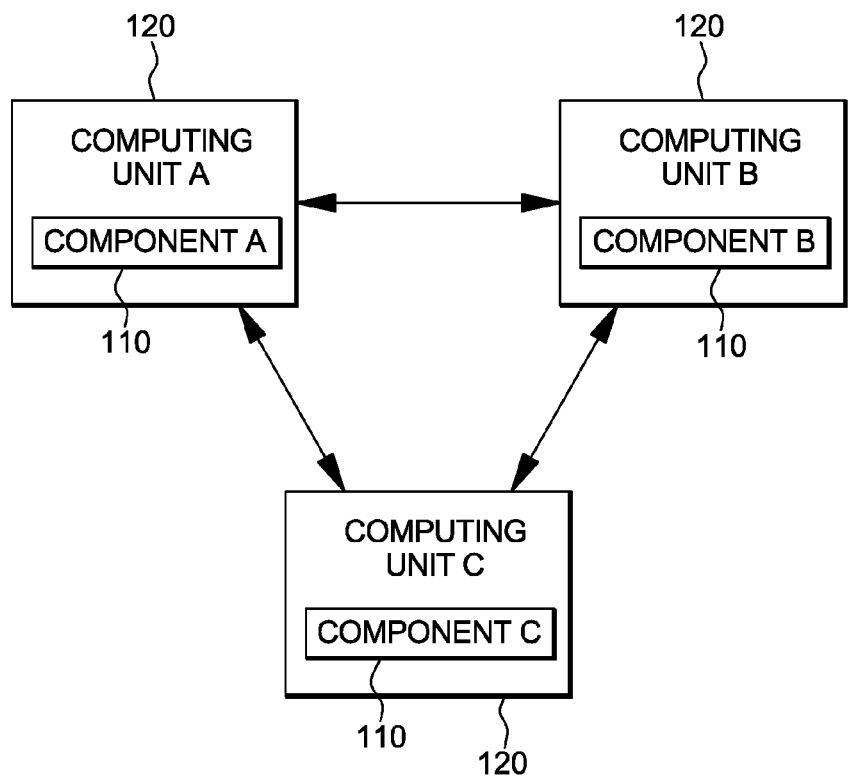
FIG. 1B depicts a distributed multi-processor embodiment of a computing environment to incorporate and use one or more aspects of the present invention.

In another embodiment, each component 110 can be executing on its own processor. For example, as shown in FIG. 1B, a plurality of computing units 120 are coupled to one another and each computing unit is executing at least one component 110, each of which performs a task for a particular operation request. This is another form of a multi-component distributed system.

Figure 2:
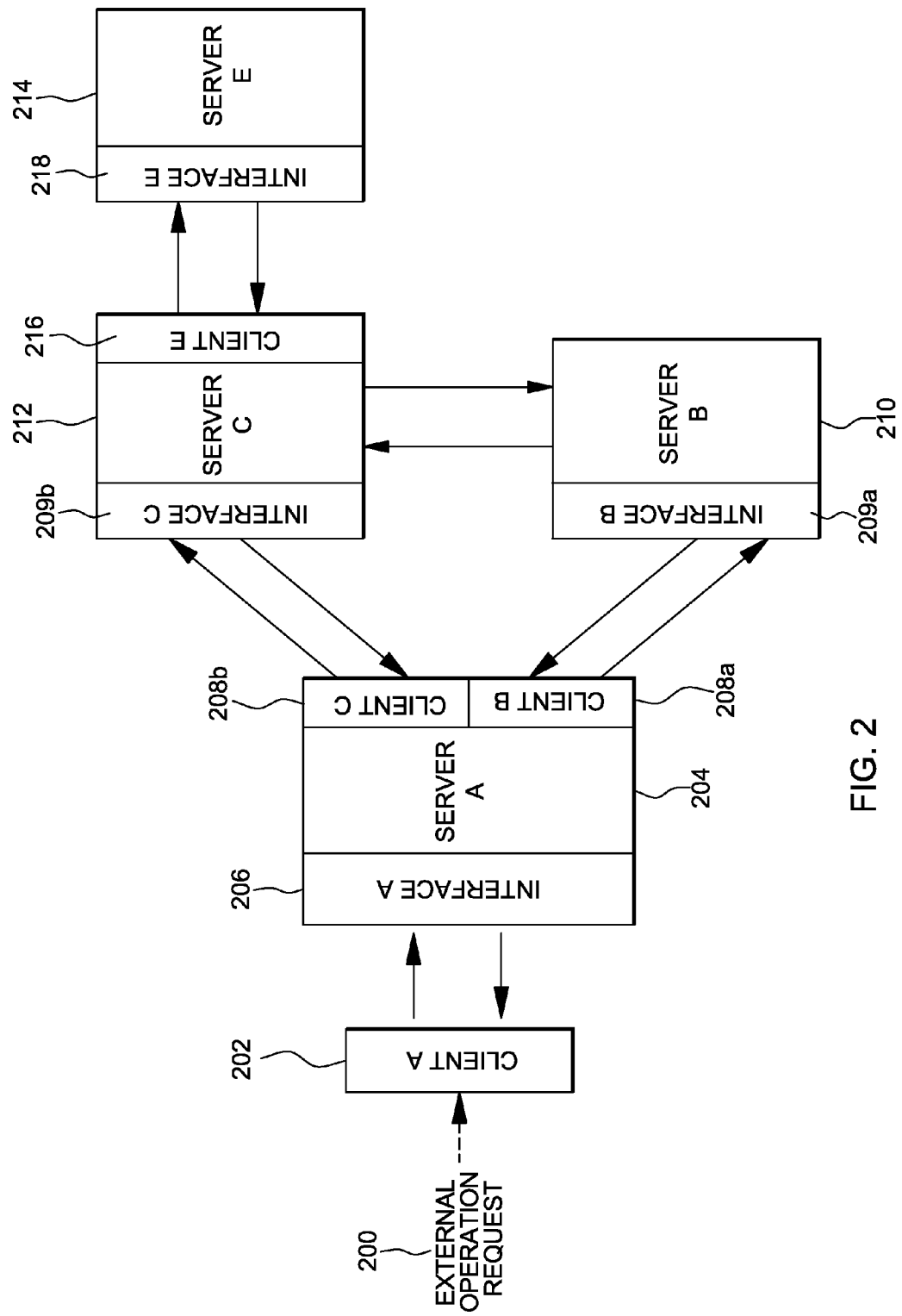
FIG. 2 depicts one example of inter-component communication via component service interfaces, in accordance with an aspect of the present invention.

Communication between the various components is further described with reference to FIG. 2. In the examples described herein, the components are referred to as servers, in which each server implements a service interface. Other types of components may be used that implement service interfaces (e.g., computer programs, daemons, etc.). As shown in the example of FIG. 2, an external operation request 200 is received by a client 202 (e.g., a program or daemon executing on a processor). The operation request, which is the request of a third party, uses a component's service interface, to perform a task on that component. In executing this task, this component may have to break the original request into sub-operation requests whose execution will be carried out by other components that are part of the distributed system. Each of the involved components might itself further break the incoming sub-operation requests and tap additional components.

Responsive to client 202 receiving the operation request, client 202 forwards the operation request or at least one task of the operation request to a server 204 (e.g., Server A). In particular, the operation request is forwarded to an interface 206 of Server A, which is used to facilitate communication between Client A and Server A. During processing of the operation request, Server A may forward sub-operation requests to other servers, such as Server B 210 and Server C 212. These sub-operation requests are forwarded from, for instance, Client B 208a to Interface B 209a of Server B; and from Client C 208b to Interface C 209b of Server C. Similarly, Server C is communicatively coupled to Server E 214, and Client E 216 forwards sub-operation requests to Interface E 218. Although various servers are depicted in FIG. 2, it is understood that a particular system may have more or less servers and interconnections between the servers.

Each server maintains internal state. For instance, a server maintains state related to its processes and any remote operations which it requests. Inter-component remote operation requests (i.e., operations between different servers) are identified and marked as either idempotent (IDEM) or non-idempotent (NIDEM). Idempotent operations allow multiple invocations of the same function without affecting the state of the server. Non-idempotent (NIDEM) operations may yield a state change in the remote server each time it is invoked. Because of the possible state changes, non-idempotent operation requests are to be handled properly to ensure that at-most-once semantics are preserved (i.e., the same invocations of a remote operation request are processed at most once on the server side). Ensuring at-most-once semantics is a collaborative task between the server's client interface and the server's interface. Multiple invocations of the same operation request are either harmless or are flagged and correctly dealt with. As defined herein, state is the information that the server maintains in order to function and which is to be persisted and recovered after a failure. The state includes, for instance, information regarding communication between components, as well as internal data structures, etc., dependent on the particular process a component implements or supports.

Figure 3A:
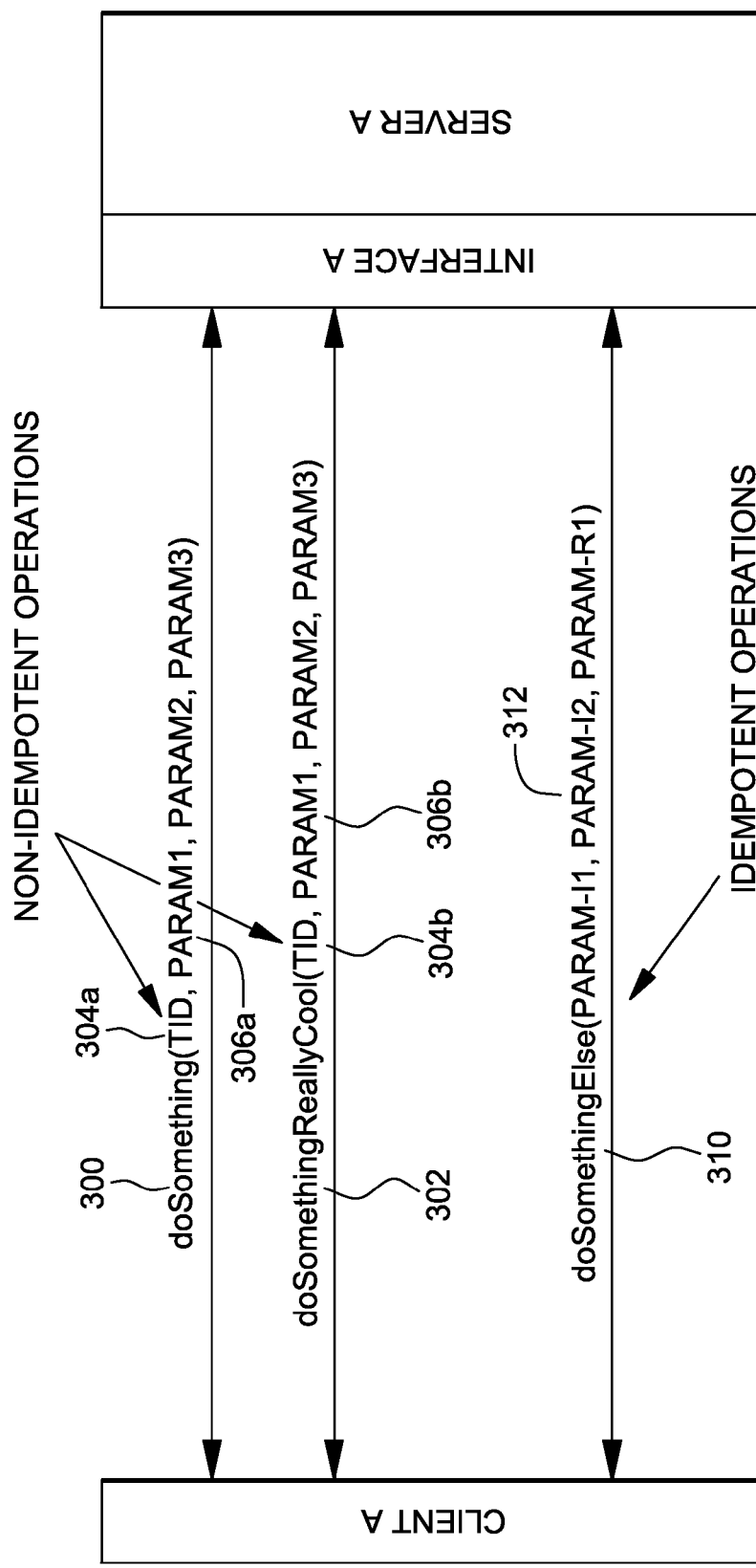
FIG. 3A depicts various types of non-idempotent and idempotent operations, in accordance with an aspect of the present invention.

Examples of non-idempotent and idempotent operations are depicted in FIG. 3A. As shown, there are two non-idempotent operations: a doSomething operation 300 and a doSomethingReallyCool operation 302. In accordance with an aspect of the present invention, each non-idempotent operation includes a transaction identifier 304a, 304b, respectively, used to preserve at-most-once semantics, as described below, and one or more parameters 306a, 306b, respectively. Also shown is an idempotent operation (doSomethingElse) 310, which also has associated with it a number of parameters 312. However, in this example, the idempotent operations do not include a transaction identifier. This is because each invocation of an idempotent operation does not affect the state, and therefore, the identifier is not needed to ensure proper handling for at-most-once semantics.

The transaction identifier can be any type of identifier created in any number of ways. In this example, it is a unique, monotonically increasing sequential number. In one example, it is generated on the client side. For an inter-component call, in one example, it is generated when the asynchronous work item is created. In a further example, for a command line interface (CLI) call, it is generated when the CLI call originates.

Figure 3B:
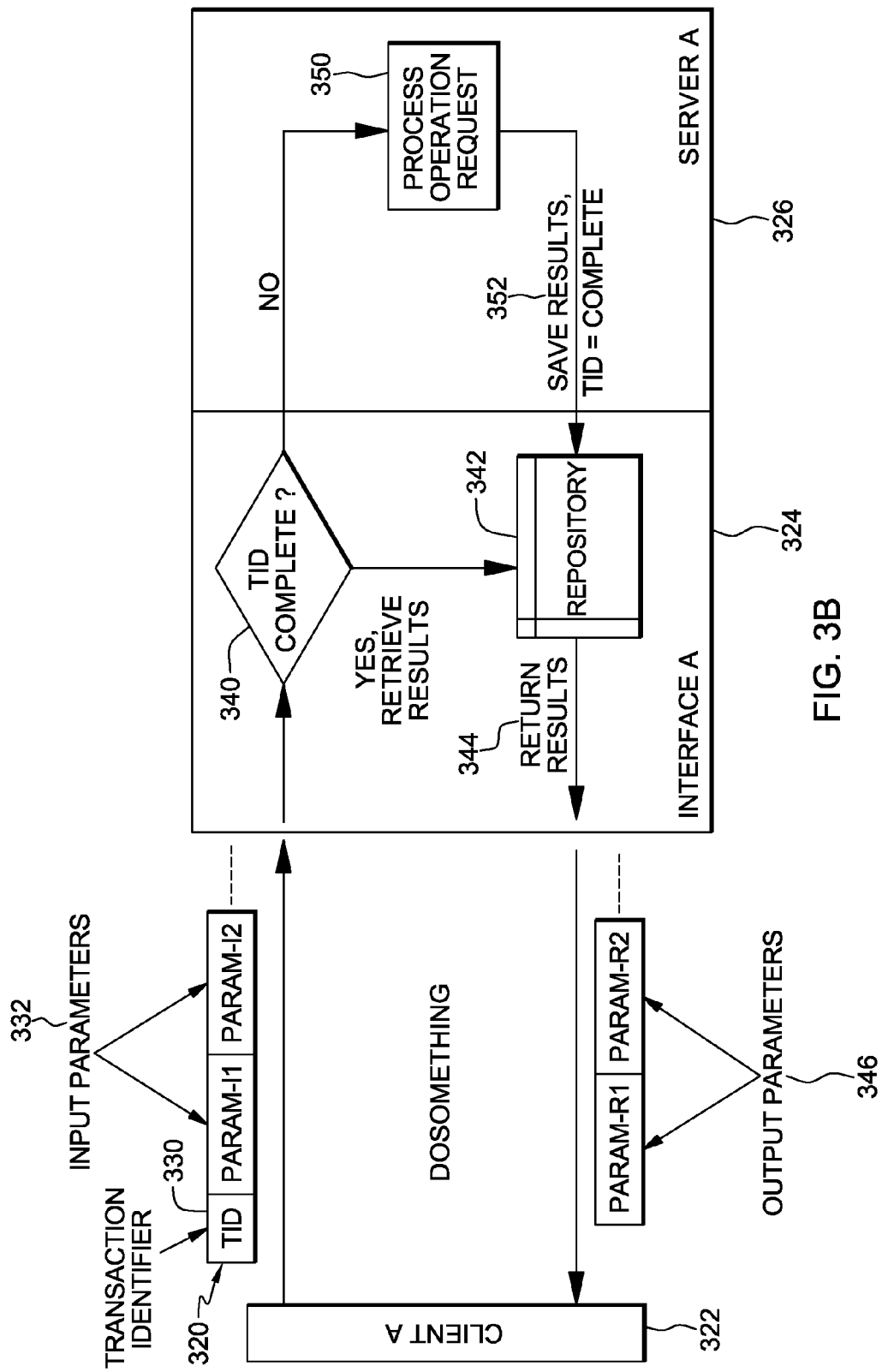
FIG. 3B depicts one example of processing associated with non-idempotent operations, in accordance with an aspect of the present invention.

The use of the transaction identifier for a non-idempotent operation is further described with reference to FIG. 3B. A non-idempotent operation request 320 received by a client 322 is forwarded to an interface 324 of a server 326. The non-idempotent operation includes a transaction identifier 330 and a plurality of input parameters 332. Responsive to receiving the operation, interface 324 determines whether processing associated with this transaction identifier is already complete, INQUIRY 340. This determination is made by, for instance, checking a repository (e.g., local) 342 of completed operations. If the transaction identifier is included in the repository, then the operation is already complete. Therefore, the results are retrieved from repository 342 and returned, STEP 344. In one example, the results are returned as output parameters 346 to client 322.

Returning to INQUIRY 340, if the operation has not already been processed to completion, then it is processed, STEP 350; and the results and the transaction identifier are saved in repository 342, STEP 352. In one example, the transaction identifier may have a flag associated therewith indicating completion. In other examples, completion is indicated by the mere existence in the repository with associated results.

Figure 4:
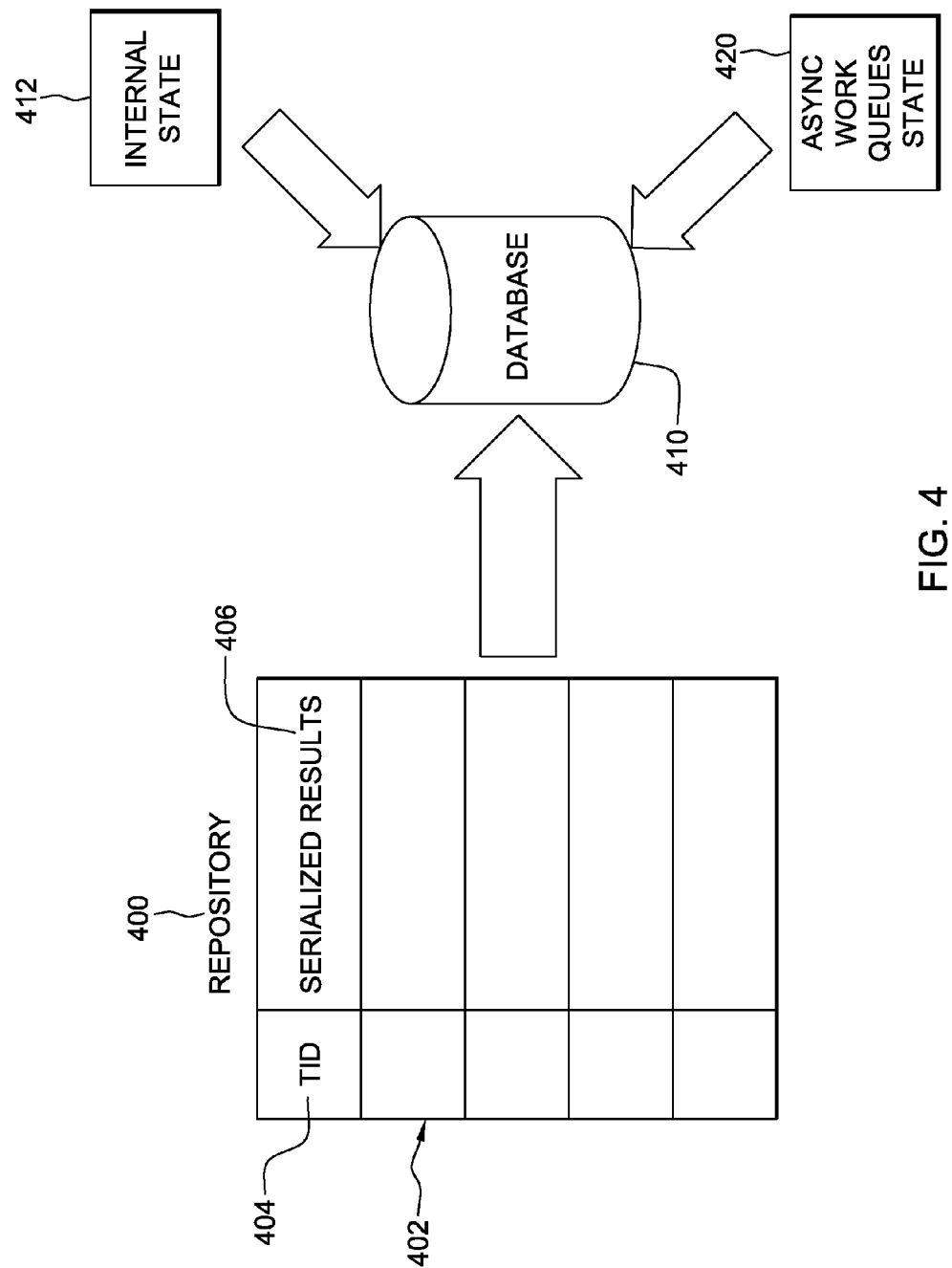
FIG. 4 depicts examples of information persisted in a data store, in accordance with an aspect of the present invention.

Further details regarding a repository for storing the transaction identifiers are described with reference to FIG. 4. As shown, a repository 400 includes one or more entries 402. Each entry 402 includes a transaction identifier 404 for a non-idempotent operation and results 406 associated with that operation. This repository is persisted in a data store 410, such as a DB2® database, other database, or other type of data store. DB2® is a registered trademark of International Business Machines Corporation, Armonk, N.Y.

In further embodiments, internal state 412 of the server is also persisted in data store 410, as well as one or more asynchronous work queues 420, which include remote non-idempotent operations and other work items, as described in further detail below. The data store is, for instance, a persistent data store external to the component and may or may not be shared with one or more other components.

In one embodiment, the size of the repository is managed by employing pluggable policies, such as, for instance, the use of a circular buffer, the use of a threshold on how long of a transaction history to keep, etc.

Further details regarding processing non-idempotent operations are described with reference to FIG. 5. In this example, an external operation request triggers multiple inter-component interactions. That is, an incoming non-idempotent operation request triggers one or more non-idempotent and/or idempotent sub-operation requests to other components. Each component maintains part of the system state, which needs to be consistent with the states of other components.

Figure 5:
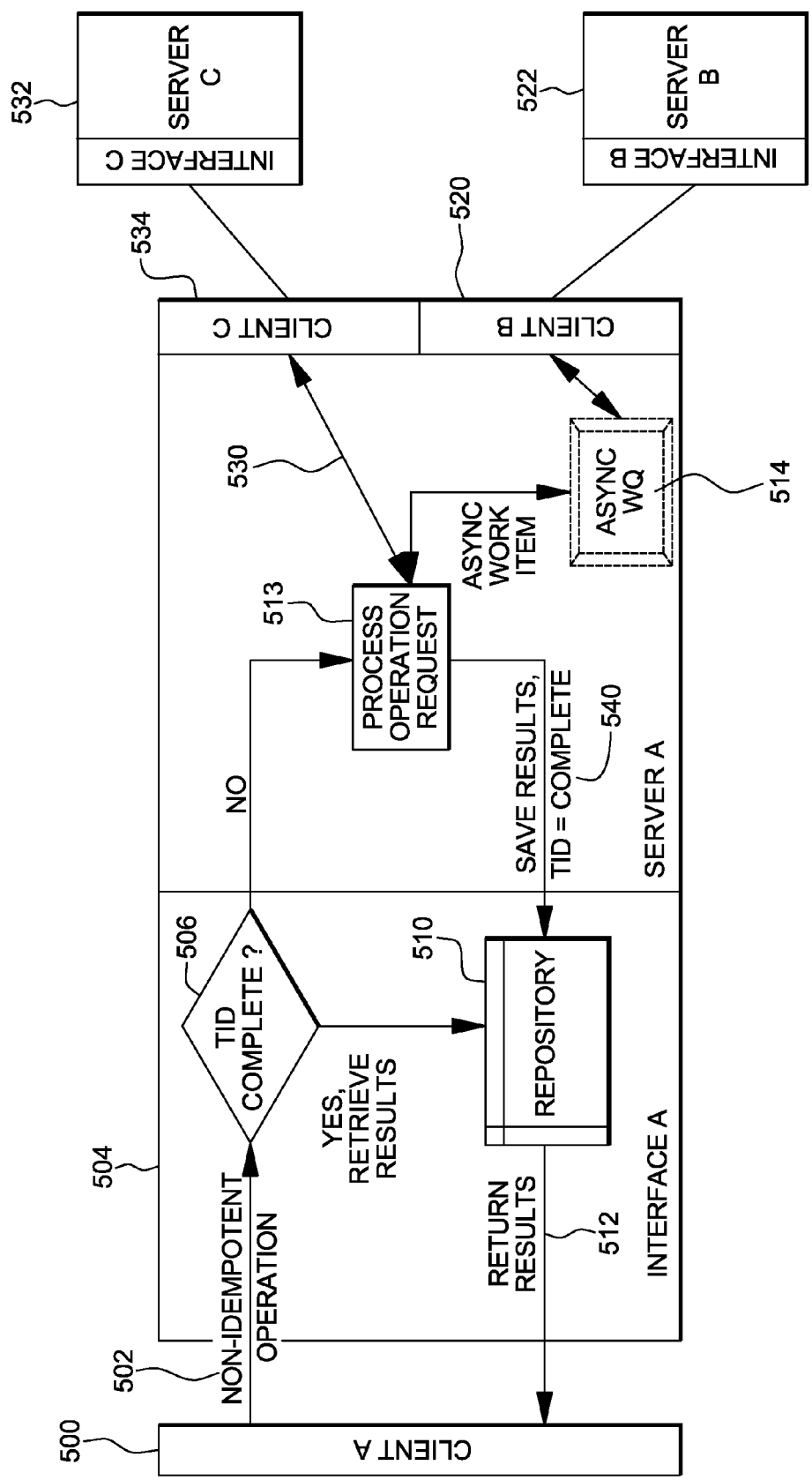
FIG. 5 depicts one example of execution flow of a non-idempotent operation, in accordance with an aspect of the present invention.

Referring to FIG. 5, responsive to an operation request received by Client A 500, a non-idempotent operation 502 of the operation request is forward from Client A to Interface A 504. Interface A determines whether the non-idempotent operation has already been performed, INQUIRY 506. For example, it compares the transaction identifier of the non-idempotent operation with completed transaction identifiers. If the transaction identifier has already been completed, INQUIRY 506, then the results of that transaction are retrieved from repository 510 and are returned 512 to Client A.

However, if the non-idempotent operation has not already been performed, then the operation request is processed, STEP 513. As part of processing the operation request, in one example, one or more sub-operation requests on other components might be triggered. In this example, if the triggered sub-operation request is a remote non-idempotent operation, then it is stored on an asynchronous work queue 514 as a work item. This work queue is local to the processing server (e.g., Server A) and each non-idempotent sub-operation request placed on the work queue has its own transaction identifier, which is different form the transaction identifier of the operation request that triggered the sub-operation request.

Responsive to processing the operation request, including placing the one or more sub-operation requests on one or more asynchronous work queues, results may be produced and saved in repository 510, along with the transaction identifier of the operation request, STEP 540. This information is persisted in a data store. In this example, the state persisted in the data store includes the repository (e.g., the operation request and the transaction identifier) and at least an indication of the work items on the asynchronous work queue (or the queue, itself).

Additionally, as part of processing the operation request, certain sub-operation requests, such as idempotent sub-operation requests, may be directly forwarded to a server, as indicated by arrow 530. That is, in this case, an asynchronous work queue is not used. Those items are directly forwarded to, for instance, Server C 532 via Client C 534. Server C then processes the idempotent operation(s) in the same manner as Server A would process such operations. Idempotent operations can also be performed asynchronously.

Subsequent to completing the operation request on Server A and persisting the internal state, work items on the asynchronous work queue are executed by work threads of Server A. For instance, a work thread retrieves a work item from asynchronous work queue 514 and processes that work item. In one example, this processing includes forwarding the work item to Server B 522 via Client B 520 to be processed by Server B. Server B processes the sub-operation request, which in this example is a non-idempotent operation, in the same manner that Server A processes a non-idempotent operation. Each non-idempotent sub-operation request will have its own transaction identifier, which is included as part of the work item on the work queue. It is processed by the processing server (e.g., Server B), and the results are saved in a repository accessible to the processing server, along with its transaction identifier. This repository is also persisted in a data store accessible to Server B.

Responsive to Server B completing its processing, it sends a completion indication to the work thread of Server A. The work thread then deletes the work item from the queue, assuming successful completion of the work item. Similarly, any other work item that completes successfully, whether performed locally or remotely, is removed from the work queue.

Further details regarding asynchronous work queue 514 are described with reference to FIG. 6. As shown in FIG. 6, asynchronous work queue 514 may include one or more entries, and each entry may be a non-idempotent operation or an idempotent operation. While, in accordance with an aspect of the present invention, to perform a non-idempotent operation, it is to be placed on the work queue and asynchronously performed, idempotent operations need not be placed on the work queue or performed asynchronously. However, if desired, such operations may be asynchronously processed by placing them on the asynchronous work queue. Subsequent to performing an asynchronous work item retrieved from the asynchronous work queue, that work item is deleted from the queue on completion. Therefore, those completed items are not repeated during recovery.

In one embodiment, non-idempotent operation requests are tied to database transaction boundaries. By using transaction boundaries, until the commit happens, no data for the current operation request is persisted. If a crash happens anytime before the commit, no data is persisted. If a crash happens after the commit, all data related to the call is persisted and will be recovered on restart. One example of a transaction boundary is as follows:

(1) Begin Non-idempotent Operation (tid)
(2) Transaction Begin
(3) Non-Idempotent Operation Processing Logic
(4) Store Non-Idempotent Operation Result (tid, result)
(5) Transaction End (commit)
(6) End Non-Idempotent Operation As shown above, a transaction with a particular transaction id begins (2), certain processing is performed (3), and the results are stored, as well as the transaction id (4). The transaction then ends and a result is committed to a data store (5).

Figure 7:
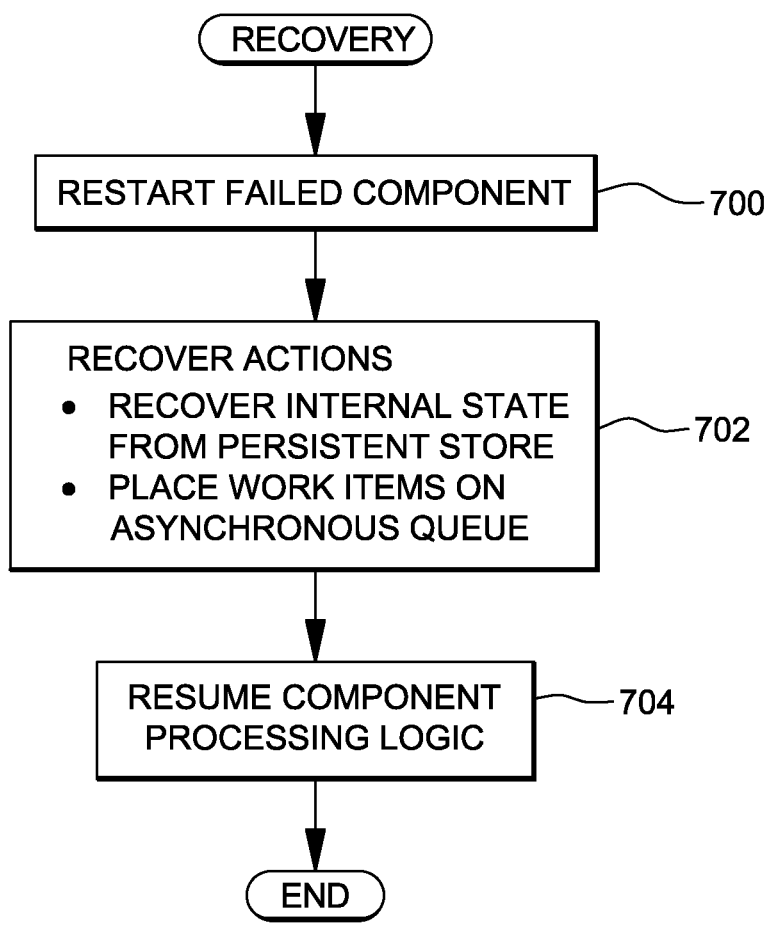
FIG. 7 depicts one example of the recovery logic used by a component when it is restarted, in accordance with an aspect of the present invention.

In one embodiment, when a component fails, recovery is performed. Details regarding performing recovery are described with reference to FIG. 7. As one example, responsive to a component of a distributed processing system failing, the failed component is restarted, STEP 700. This includes, for instance, re-spawning the component process on the same or a different host. The restart can be triggered by any external entity, automatically by a system or manually, and in one example, is to be performed as soon as possible after the failure. As examples, the restart may be performed by a watchdog process, a job or an administrator.

Thereafter, the restarted component recovers its actions, STEP 702. For example, it recovers the static state from the data store (e.g., internal structures, sets of jobs, etc. depending on particular process). That is, the restarted component reads its static state from the data store and may place it in its local repository. Further, it recovers its dynamic state. The dynamic state includes the asynchronous work items that were on the asynchronous work queue when the component failed. Thus, the restarted component determines if one or more work items were on the asynchronous work queue when it failed. If so, those one or more work items are placed back on the asynchronous work queue.

Subsequently, the component begins functioning once again, STEP 704. Remote operation requests into the component are accepted. Other components retrying remote operation requests to the failed component have their operation requests accepted and processed, if needed. Further, asynchronous work items begin executing and performing remote operation requests to other components.

In recovery, the data store is used to restore internal structures to pre-crash state. For ongoing operations, the data store is used to restore the internal structures to pre-crash/pre-operation state. The work items are restored in the queue. Work items that were started, but did not complete, may be repeated, but handling of non-idempotent calls in the manner described herein (e.g., using the transaction identifier to determine if complete and only processing if not complete) makes this harmless. If, for example, a crash occurs during a submit job, either the internal data structures reflect the pre-submit state or the internal data structures have been updated to reflect a new job and an asynchronous work item is queued waiting to be launched.

Multiple failed components may be restarted in any order. Failed components are restarted quickly, in one example, in order for a clean recovery. The recovery process can also be used to relocate components that may have not failed. That is, moving components to a different host to allow the current host to be scheduled for maintenance.

In accordance with an aspect of the present invention, while a failed component is inaccessible, remote components continue to retry remote requests that failed due to the inaccessibility of the failed component. Different retry policies can be implemented and used as needed. These include, for instance, bounded retries with exponential backoff wait, typically used when the client is a CLI (command-line interface) process; and unbounded retries with exponential backoff wait, typically used for component to component operations. The number of times that an operation request may be retried may be indefinite or bounded depending on implementation.

One embodiment of the logic for retrying a command-line interface request is described with reference to FIG. 8A; and one embodiment of logic for retrying an inter-component operation request is described with reference to FIG. 8B.

Figure 8A:
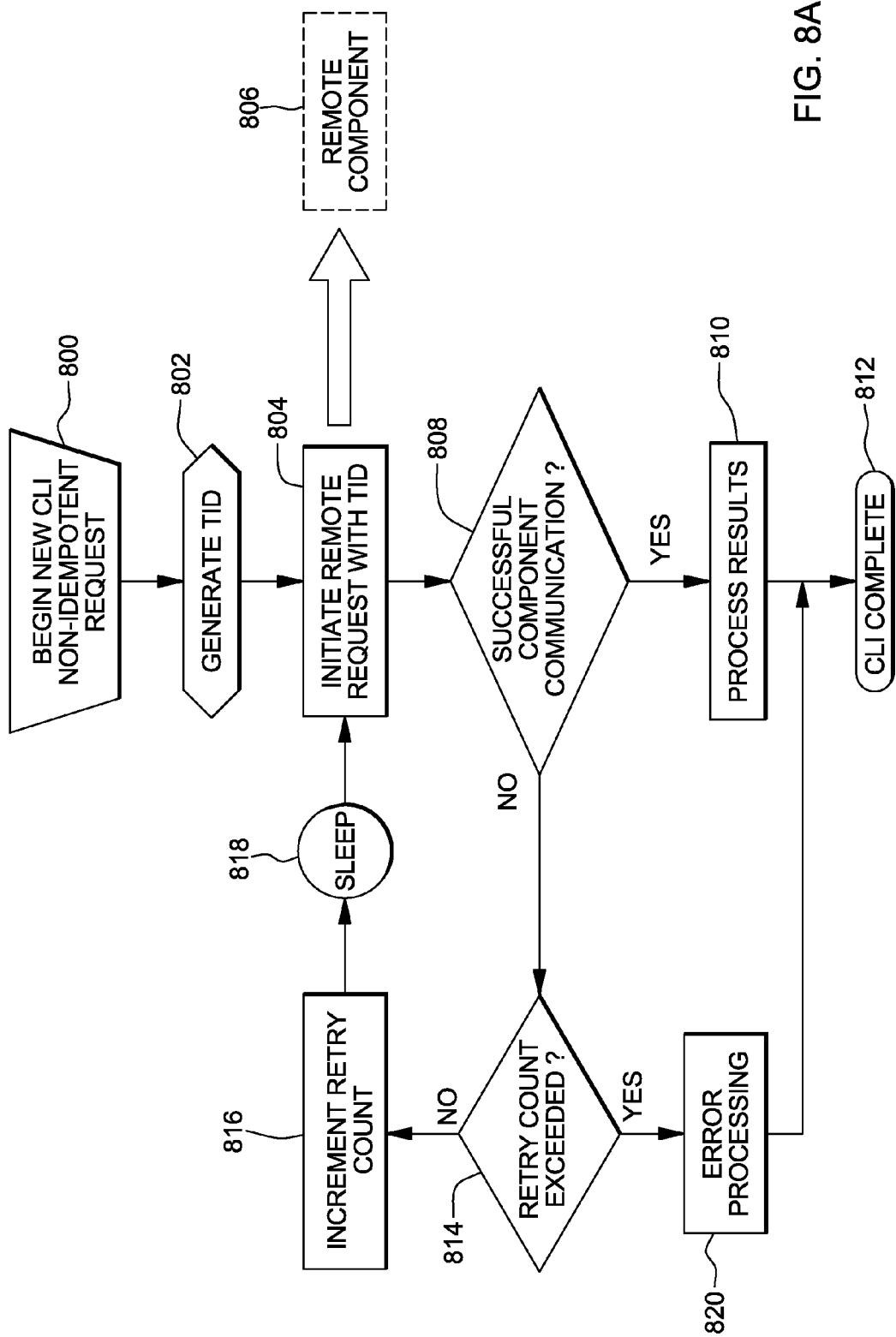
FIG. 8A depicts one example of command line interface retry logic used in accordance with an aspect of the present invention.

Referring to FIG. 8A, initially a new command-line interface non-idempotent operation request is commenced by a client, STEP 800. Responsive to starting the operation request, a transaction identifier is generated by the client, STEP 802. Thereafter, a remote operation request with the transaction identifier is initiated, STEP 804, and is to be performed by a remote component 806.

A determination is made as to whether there was successful communication with the remote component, INQUIRY 808. If so, then the results are processed, STEP 810, and the processing is complete, STEP 812.

However, returning to INQUIRY 808, if communication with the remote component was not successful, then a determination is made as to whether a retry count has been exceeded, INQUIRY 814. If not, then the retry count is incremented, STEP 816, and the process is delayed for a pre-defined amount of time, STEP 818. Thereafter, the remote operation request is initiated once again, STEP 804.

Returning to INQUIRY 814, if the retry count is exceeded, then an error is indicated, STEP 820, and processing is complete, STEP 812.

In a further example, an operation request from the asynchronous work queue is initiated by a work thread, rather than via the command-line interface. This processing is described with reference to FIG. 8B. Initially, a new asynchronous work item is created and placed on the asynchronous work queue, STEP 850. A transaction identifier is generated for the work item, STEP 852, and that work item is persisted (i.e., stored in persistent storage), STEP 854.

At some point in time, asynchronous request processing is commenced, STEP 860. A remote operation request with the transaction identifier is initiated, STEP 862, and is to be processed by a remote component 864.

A determination is made as to whether the communication with the remote component is successful, INQUIRY 866. If so, then the results are processed, STEP 868, and the work item is deleted from the asynchronous work queue, STEP 870.

Returning to INQUIRY 866, if the communication with the remote component is not successful, then a determination is made as to whether the component was shutdown or the operation request was cancelled, INQUIRY 872. If so, then an error may be indicated, STEP 874, and the work item is deleted from the queue, STEP 870.

Returning to INQUIRY 872, if the component is not shutdown and the operation request is not cancelled, then the retry count is incremented, STEP 878, and the operation request is delayed for a predetermined amount of time, STEP 880. Thereafter, the remote operation request is reinitiated, STEP 862.

In a further example, the retry count is incremented after checking whether a retry count threshold has been exceeded. If it has not been exceeded, then it is incremented. Otherwise, an error is indicated and it is not incremented.

The fault tolerant capability described above maintains overall consistency in component-based distributed systems, so that failures in one or more or all components of the system can be tolerated and recovered simply by restarting the failed components. The capability reduces overhead by avoiding the use of replicas for each critical stateful component. It does not rely on the robustness of underlying infrastructures, like Corba (Common Object Request Broker Architecture) ORBs (Object Request Broker), etc., and hence is not dependent on specific communication mechanisms. It reduces complexity by not having to rollback multiple operations in multiple components in order to recover from failure. It facilitates maintenance by allowing the move, restart, etc. of system components using no extra logic. It enables the system for high-availability where simply restarting the failed component(s) enables all pending and new operations. Hot standbys can also be supported. The capability is implemented at an application level; independent of the underlying communication mechanism; and independent of the underlying data store.

In accordance with an aspect of the present invention, global distributed fault-tolerance can be achieved by ensuring that individual components adhere to two design features:

(1) The ability to persist servers' internal state, where internal state includes internal data structures, as well as the state of pending remote operation requests to other distributed services.

(2) The ability to expose servers' service interfaces as idempotent and non-idempotent operation requests implemented using transactional boundaries, as described herein. For non-idempotent operation requests, the state (completion/ongoing/non-completion) of a particular operation request is also part of the component internal state to be included in a durable repository (a durable logger, a database, or a remote state manager, as examples).

The framework of one or more aspects of the present invention provides the following support:

(1) A data structure wrapper that allows the component's internal state to be automatically persisted with support for serialization/deserialization of complex objects;

(2) Reliable transport for handling incoming and outgoing operation requests—the reliability support provides the means to identify operations as idempotent/non-idempotent, provides transaction id support, and an operation retry policy;

(3) The definition of algorithmic transaction boundaries;

(4) A mechanism for capturing the internal state of a pool of work queues, which carry out remote operation requests on behalf of an operation request to the component;

(5) A mechanism for executing remote operation requests which may change the state of other components; and (6) A mechanism for storing and retrieving results of operation requests that have already completed and may be repeated.

One or more aspects of the present invention also provide software rejuvenation capabilities, including, for instance, scheduled shutdowns and restarts, as well as hot-swap capabilities, i.e., a component can be transparently shutdown and moved around to another host.

Many types of systems can include and use one or more aspects of the present invention. One such system is InfoSphere® Streams offered by International Business Machines Corporation, Armonk, N.Y.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 9:
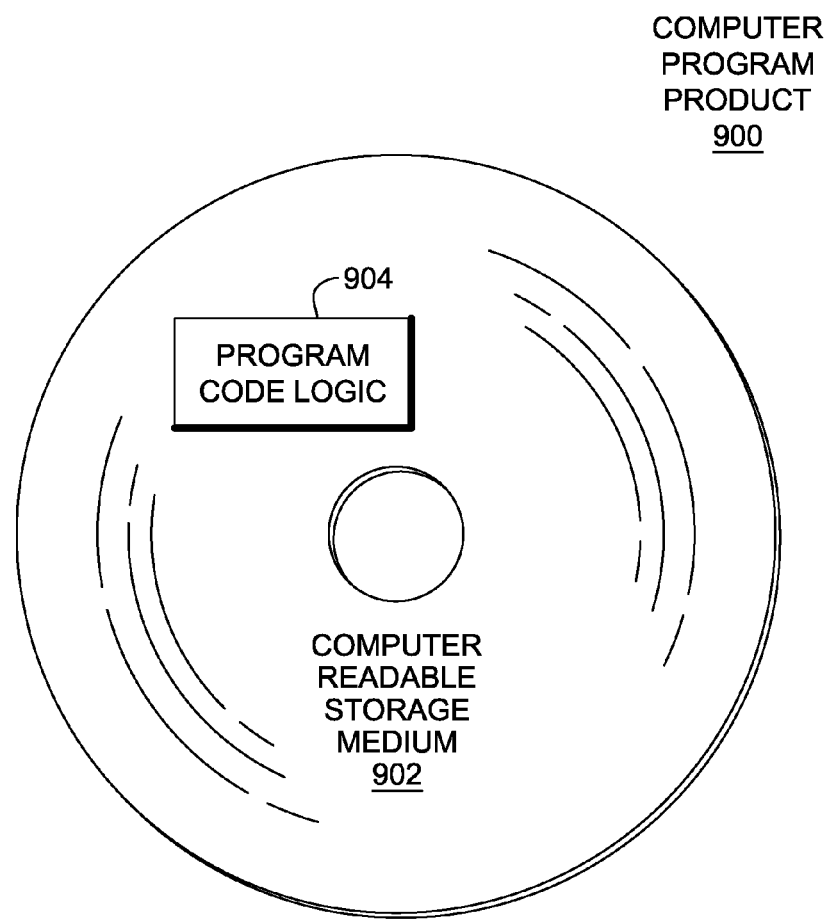
FIG. 9 depicts one embodiment of a computer program product incorporating one or more aspects of the present invention.

Referring now to FIG. 9, in one example, a computer program product 900 includes, for instance, one or more computer readable storage media 902 to store computer readable program code means or logic 904 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, other types of multi-component systems may include one or more aspects of the present invention. Additionally, the information provided in the repository may be different than included herein, and management of the repository may be other than described herein. Many variations are possible without departing form the spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/ or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of managing execution of operation requests to facilitate fault tolerance in a distributed system having a plurality of components, said method comprising:
    receiving at one component of the distributed system an operation request to be processed, the one component executing on a processor;
    processing, by the one component, the operation request, the processing including initiating one or more sub-operation requests to be performed by at least one other component of the distributed system;
    storing at least an indication of the one or more sub-operation requests in an asynchronous work queue to be asynchronously processed by the at least one other component, the asynchronous work queue including one or more sub-operation requests for which processing is incomplete;
    storing state related to the operation request in a persistent data store, said state including at least an indication of the one or more sub-operation requests on the asynchronous work queue; and
    responsive to storing the state in the persistent data store and completing the operation request, asynchronously initiating execution of a sub-operation request of the one or more sub-operation requests on the asynchronous work queue.

2. The method of claim 1, further comprising:
    determining, by the one component, that it is being restarted;
    performing recovery, by the one component, responsive to being restarted, said performing recovery comprising:
        obtaining from the persistent data store the state including the at least an indication of the one or more sub-operation requests included on the asynchronous work queue; and
        restoring the asynchronous work queue placing the one or more sub-operation requests back on the asynchronous work queue; and
    resuming processing of the one component, said resuming processing comprising servicing one or more remote operation requests.

3. The method of claim 2, further comprising:
    determining by a remote component that the one component has failed; and
    automatically retrying a requested operation to be performed by the one component one or more times.

4. The method of claim 1, further comprising determining whether the operation request is a non-idempotent operation or an idempotent operation, and wherein based on the operation request being a non-idempotent operation, a transaction identifier associated with the operation request is to be used in determining whether the operation request has been previously processed to completion.

5. The method of claim 4, wherein the non-idempotent operation is tied to a database transaction boundary in that data is persisted for the non-idempotent operation responsive to performing a transaction commit operation.

6. The method of claim 4, further comprising:
    determining whether the non-idempotent operation has previously been processed to completion, said determining checking a repository of complete transaction identifiers for the transaction identifier associated with the non-idempotent operation; and
    processing the non-idempotent operation responsive to determining the non-idempotent operation has not been previously processed to completion.

7. The method of claim 1, wherein the sub-operation request has a transaction identifier associated therewith, and said method further comprises storing results from the execution of the sub-operation request and the transaction identifier in a repository, responsive to executing the sub-operation request.

8. The method of claim 7, further comprising deleting the sub-operation request from the asynchronous work queue responsive to completing execution of the sub-operation request.

9. The method of claim 1, further comprising:
    responsive to receiving the operation request, determining whether the operation request is a non-idempotent operation or an idempotent operation;
    responsive to determining the operation request is a non-idempotent operation, using a transaction identifier associated with the non-idempotent operation to determine whether the non-idempotent operation has been previously processed to completion;
    executing the non-idempotent operation, responsive to determining that the non-idempotent operation has not been previously processed to completion; and
    retrieving results from a repository, responsive to determining that the non-idempotent operation has been previously processed to completion, wherein execution is not repeated.

10. The method of claim 9, further comprising processing the idempotent operation, responsive to determining that the operation request is an idempotent operation, the processing being independent of transaction identifier use.

11. A computer system for managing execution of operation requests to facilitate fault tolerance in a distributed system having a plurality of components, said computer system comprising:
    a memory; and
    a processor in communications with the memory, wherein the computer system is configured to perform a method, the method comprising:
        receiving at one component of the distributed system an operation request to be processed;
        processing, by the one component, the operation request, the processing including initiating one or more sub-operation requests to be performed by at least one other component of the distributed system;
        storing at least an indication of the one or more sub-operation requests in an asynchronous work queue to be asynchronously processed by the at least one other component, the asynchronous work queue including one or more sub-operation requests for which processing is incomplete;

storing state related to the operation request in a persistent data store, said state including at least an indication of the one or more sub-operation requests on the asynchronous work queue; and responsive to storing the state in the persistent data store and completing the operation request, asynchronously initiating execution of a sub-operation request of the one or more sub-operation requests on the asynchronous work queue.

12. The computer system of claim 11, wherein the method further comprises:

determining, by the one component, that it is being restarted;

performing recovery, by the one component, responsive to being restarted, said performing recovery comprising:

obtaining from the persistent data store the state including the at least an indication of the one or more sub-operation requests included on the asynchronous work queue; and restoring the asynchronous work queue placing the one or more sub-operation requests back on the asynchronous work queue; and resuming processing of the one component, said resuming processing comprising servicing one or more remote operation requests.

13. The computer system of claim 12, wherein the method further comprises:

determining by a remote component that the one component has failed; and automatically retrying a requested operation to be performed by the one component one or more times.

14. The computer system of claim 11, wherein the sub-operation request has a transaction identifier associated therewith, and said method further comprises:

storing results from the execution of the sub-operation request and the transaction identifier in a repository, responsive to executing the sub-operation request; and deleting the sub-operation request from the asynchronous work queue responsive to completing execution of the sub-operation request.

15. The computer system of claim 11, wherein the method further comprises:

responsive to receiving the operation request, determining whether the operation request is a non-idempotent operation or an idempotent operation;

responsive to determining the operation request is a non-idempotent operation, using a transaction identifier associated with the non-idempotent operation to determine whether the non-idempotent operation has been previously processed to completion;

executing the non-idempotent operation, responsive to determining that the non-idempotent operation has not been previously processed to completion; and retrieving results from a repository, responsive to determining that the non-idempotent operation has been previously processed to completion, wherein execution is not repeated.

16. A computer program product for managing execution of operation requests to facilitate fault tolerance in a distributed system having a plurality of components, the computer program product comprising:

a non-transitory computer readable storage medium readable by a processing circuit and storing instructions for execution by the processing circuit for performing a method comprising:

receiving at one component of the distributed system an operation request to be processed;

processing, by the one component, the operation request, the processing including initiating one or more sub-operation requests to be performed by at least one other component of the distributed system;

storing at least an indication of the one or more sub-operation requests in an asynchronous work queue to be asynchronously processed by the at least one other component, the asynchronous work queue including one or more sub-operation requests for which processing is incomplete;

storing state related to the operation request in a persistent data store, said state including at least an indication of the one or more sub-operation requests on the asynchronous work queue; and responsive to storing the state in the persistent data store and completing the operation request, asynchronously initiating execution of a sub-operation request of the one or more sub-operation requests on the asynchronous work queue.

17. The computer program product of claim 16, wherein the method further comprises:

determining, by the one component, that it is being restarted;

performing recovery, by the one component, responsive to being restarted, said performing recovery comprising:

obtaining from the persistent data store the state including the at least an indication of the one or more sub-operation requests included on the asynchronous work queue; and restoring the asynchronous work queue placing the one or more sub-operation requests back on the asynchronous work queue; and resuming processing of the one component, said resuming processing comprising servicing one or more remote operation requests.

18. The computer program product of claim 17, wherein the method further comprises:

determining by a remote component that the one component has failed; and automatically retrying a requested operation to be performed by the one component one or more times.

19. The computer program product of claim 16, wherein the sub-operation request has a transaction identifier associated therewith, and said method further comprises:

storing results from the execution of the sub-operation request and the transaction identifier in a repository, responsive to executing the sub-operation request; and deleting the sub-operation request from the asynchronous work queue responsive to completing execution of the sub-operation request.

20. The computer program product of claim 16, wherein the method further comprises:

responsive to receiving the operation request, determining whether the operation request is a non-idempotent operation or an idempotent operation;

responsive to determining the operation request is a non-idempotent operation, using a transaction identifier associated with the non-idempotent operation to determine whether the non-idempotent operation has been previously processed to completion;

executing the non-idempotent operation, responsive to determining that the non-idempotent operation has not been previously processed to completion; and retrieving results from a repository, responsive to determining that the non-idempotent operation has been previously processed to completion, wherein execution is not repeated.

* * * * *